(12) United States Patent
Ricco' et al.

(10) Patent No.: US 11,434,028 B2
(45) Date of Patent: Sep. 6, 2022

(54) METHOD AND AN APPARATUS FOR APPLYING A SEALING STRIP TO A WEB OF PACKAGING MATERIAL

(71) Applicant: TETRA LAVAL HOLDINGS & FINANCE S.A., Pully (CH)

(72) Inventors: Marco Ricco', Spilamberto (IT); Gabriele Borasi, Spilamberto (IT); Giuseppe Esposito, Sasso Marconi (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 188 days.

(21) Appl. No.: 16/631,223

(22) PCT Filed: Jul. 30, 2018

(86) PCT No.: PCT/EP2018/070596
§ 371 (c)(1),
(2) Date: Jan. 15, 2020

(87) PCT Pub. No.: WO2019/025368
PCT Pub. Date: Feb. 7, 2019

(65) Prior Publication Data
US 2020/0216204 A1 Jul. 9, 2020

(30) Foreign Application Priority Data

Aug. 4, 2017 (EP) .................................. 17184958

(51) Int. Cl.
*B65B 9/20* (2012.01)
*B29C 65/00* (2006.01)
*B29L 31/00* (2006.01)

(52) U.S. Cl.
CPC ............ *B65B 9/20* (2013.01); *B29C 66/1122* (2013.01); *B29C 66/4312* (2013.01);
(Continued)

(58) Field of Classification Search
CPC ............ B29C 66/1122; B29C 66/4312; B29C 66/72328; B29C 66/849; B29L 2031/7166;
(Continued)

(56) References Cited

U.S. PATENT DOCUMENTS 2,899,875 A * 8/1959 Leasure .............. B29C 66/8242
493/468
2002/0157351 A1* 10/2002 Malin ..................... B65B 9/213
53/412

(Continued)

FOREIGN PATENT DOCUMENTS

| EP | 2143643 A1 | 1/2010 |
|---|---|---|
| EP | 2186624 A1 | 5/2010 |

(Continued)

OTHER PUBLICATIONS

International Search Report (PCT/ISA/210) and Written Opinion (PCT/ISA/237) dated Sep. 4, 2018, by the European Patent Office as the International Searching Authority for International Application No. PCT/EP2018/070596.

*Primary Examiner* — Andrew M Tecco
*Assistant Examiner* — Nicholas E Igbokwe
(74) *Attorney, Agent, or Firm* — Buchanan Ingersoll & Rooney PC (57) ABSTRACT

A method of applying a sealing strip onto a web of packaging material comprising advancing the web along a web advancement path; applying a first longitudinal portion of the sealing strip onto a longitudinal edge of the web, sealing the first longitudinal portion of the sealing strip onto the longitudinal edge, detecting and/or determining a correct alignment of the sealing strip with respect to the web. The detecting and/or determining of the correct alignment comprises acquiring an image of a second longitudinal portion of the sealing strip and a reference marker of a strip application (Continued)

apparatus, analyzing the acquired image to determine at least a first transversal distance between the reference marker and a longitudinal border of the second longitudinal portion; and evaluating the correct alignment/misalignment as a function of at least the first transversal distance.

8 Claims, 6 Drawing Sheets

(52) U.S. Cl.
CPC ...... *B29C 66/72328* (2013.01); *B29C 66/849* (2013.01); *B29K 2023/06* (2013.01); *B29L 2031/7166* (2013.01)

(58) Field of Classification Search
CPC ....... B65B 41/00; B65B 57/04; B65B 61/182; B65B 9/20
See application file for complete search history.

(56) References Cited

U.S. PATENT DOCUMENTS

| | | |
|---|---|---|
| 2003/0093971 A1 | 5/2003 | Terminella et al. |
| 2007/0209320 A1 | 9/2007 | Grzonka et al. |
| 2011/0036062 A1* | 2/2011 | Borsari ............... B29C 66/8161 53/548 |
| 2011/0203221 A1* | 8/2011 | Dorati ................. B29C 65/5042 53/64 |
| 2012/0112422 A1* | 5/2012 | Larsson .............. B31B 50/8129 277/631 |
| 2013/0083324 A1 | 4/2013 | Wilhelm |
| 2014/0102617 A1 | 4/2014 | Hutter et al. |

FOREIGN PATENT DOCUMENTS

| | | |
|---|---|---|
| EP | 2520416 A1 | 11/2012 |
| JP | 2008143561 A | 6/2008 |

\* cited by examiner

METHOD AND AN APPARATUS FOR APPLYING A SEALING STRIP TO A WEB OF PACKAGING MATERIAL

TECHNICAL FIELD

The present invention relates to a method for applying a sealing strip to a web of packaging material.

Furthermore, the present invention relates to an apparatus for applying a sealing strip to a web of packaging material.

Additionally, the present invention relates to a packaging machine for forming sealed packages filled with a pourable product having an apparatus for applying a sealing strip to a web of packaging material.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by sealing and folding laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging machines, which advance a web of packaging material through a sterilization unit of the packaging machine for sterilizing the web of packaging material, e.g. by means of chemical sterilization (e.g. by applying a chemical sterilizing agent, such as a hydrogen peroxide solution) or physical sterilization (e.g. by means of an electron beam). Then, the sterilized web of packaging material is maintained and advanced within an isolation chamber (a closed and sterile environment), and is folded and sealed longitudinally to form a tube, which is further fed along a vertical advancing direction.

In order to complete the forming operations, the tube is continuously filled with a sterilized or sterile-processed pourable food product, and is transversally sealed and subsequently cut along equally spaced transversal cross sections within a package forming unit of the packaging machine during advancement along the vertical advancing direction.

Pillow packages are so obtained within the packaging machine, each pillow package having a longitudinal sealing band and a pair of top and bottom transversal sealing bands.

Furthermore, prior to the folding and the longitudinal sealing a sealing strip of heat-seal plastic material is applied and sealed onto a first longitudinal edge of the web of packaging material. The web of packaging material is folded such that the sealing strip is in contact with the inner sides of the tube. Thus, the sealing strip gets into contact with the pourable product.

More specifically, the sealing strip is normally heat sealed to the inner plastic layer of the web of packaging material at a pressing station to which the web of packaging material and the sealing strip, one or both heated beforehand, are fed along respectively the web advancement path and a strip advancement path, and where the sealing strip is pressed onto the first longitudinal edge of the web of packaging material. After the application, the sealing strip has a first longitudinal portion heat-sealed to the first longitudinal edge of the web, and a second longitudinal portion projecting therefrom.

During the formation of the tube from the web of packaging material together with the sealed sealing strip, a second longitudinal edge of the web of packaging material opposed to the first longitudinal edge is laid on the outside of the first longitudinal edge with respect to the axis of the tube being formed. More specifically, the sealing strip is located entirely inside the tube, and the face of the second longitudinal edge facing the axis of the tube is superimposed partly on the second longitudinal portion of the sealing strip, and partly on the face of the first longitudinal edge located on the opposite side to the first portion of the sealing strip.

The main scope of the sealing strip is to avoid that the first longitudinal edge of the web of packaging material gets into contact with the pourable product, as otherwise the packaging material would absorb the pourable product (in such a case the obtained packages must be discarded from distribution).

Additionally, the sealing strip prevents micro-organisms possibly present on the first longitudinal edge from contaminating the pourable product packed in the package.

Furthermore, the sealing strip provides for an improved strength and improved gas barrier properties of the seam portion.

In order for the sealing strip to properly function, it is necessary to correctly position the sealing strip with respect to the web of packaging material.

Furthermore, the alignment between the sealing strip and the web of packaging material during the package formation has to be controlled. In case a misalignment is detected, the production is interrupted and a technical operator realigns the sealing strip with respect to the web of packaging material. After the realignment, the production is resumed.

EP-A-2186624 discloses a packaging machine having a strip application apparatus comprising a control device for monitoring the alignment of the sealing strip with respect to the web of packaging material.

The packaging machine also comprises a conveying apparatus for advancing the web of packaging material along a web advancement path, a sterilizing unit for sterilizing the web of packaging material, a tube forming device for forming the tube from the advancing web of packaging material, a longitudinal sealing device for longitudinally sealing the tube along a seam portion of the tube, a filling pipe for continuously filling the tube with the pourable product and a package forming unit adapted to produce the single packages from the tube of packaging material by forming, transversally sealing and transversally cutting the packages.

The strip application apparatus comprises an advancement device adapted to advance the sealing strip along a strip advancement path and for placing the first longitudinal portion of the sealing strip onto the web of packaging material and a strip sealing device for sealing the sealing strip on the web of packaging material.

The strip sealing device comprises a sealing head adapted to heat the web of packaging material and the sealing strip and pressure rollers for pressing the web of packaging material and the sealing strip at a pressuring station.

The control device comprises a light source for irradiating a transversal portion of the web of packaging material and a sensor element for detecting the light intensity in dependence of the transversal position. As the web of packaging material and the sealing strip present different reflection and transmission properties, differences in the light intensity can be attributed to the web of packaging material and the sealing strip.

Furthermore, the control device is configured to deduce the width of the second longitudinal portion, which must be in a given range so that the sealing strip is considered to be correctly aligned with respect to the web of packaging material.

Even though the packaging machine disclosed in EP-A-2186624 provides for good results, a need is felt within the industry to further improve the continuous and accurate control of the alignment of the sealing strip with respect to the web of packaging material.

A need is also felt within the industry to adjust the above-mentioned alignment when necessary, without interruption of the packaging machine, to ensure the correct application of the sealing strip onto the web of packaging material.

A further need is felt to constantly and accurately control the alignment of the sealing strip and/or the web of packaging material with respect to the sealing head of the sealing device.

DISCLOSURE OF INVENTION

It is an object of the present invention to provide for a method for detecting the alignment of a sealing strip onto a web of packaging material, for achieving at least one of the above aims in a straightforward and low-cost manner.

It is a further object of the present invention to provide for a strip application apparatus for detecting the alignment of a sealing strip onto a web of packaging material, for achieving at least one of the above aims in a straightforward and low-cost manner.

It is a further object of the present invention to provide for a packaging machine having a strip application apparatus for detecting the alignment of a sealing strip onto a web of packaging material, for achieving at least one of the above aims in a straightforward and low-cost manner.

According to the present invention, there is provided a method as claimed.

According to the present invention, there is also provided a strip application apparatus as claimed.

According to the present invention, there is also provided a packaging machine.

Further advantageous embodiments according to the invention are specified in the dependent claims.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
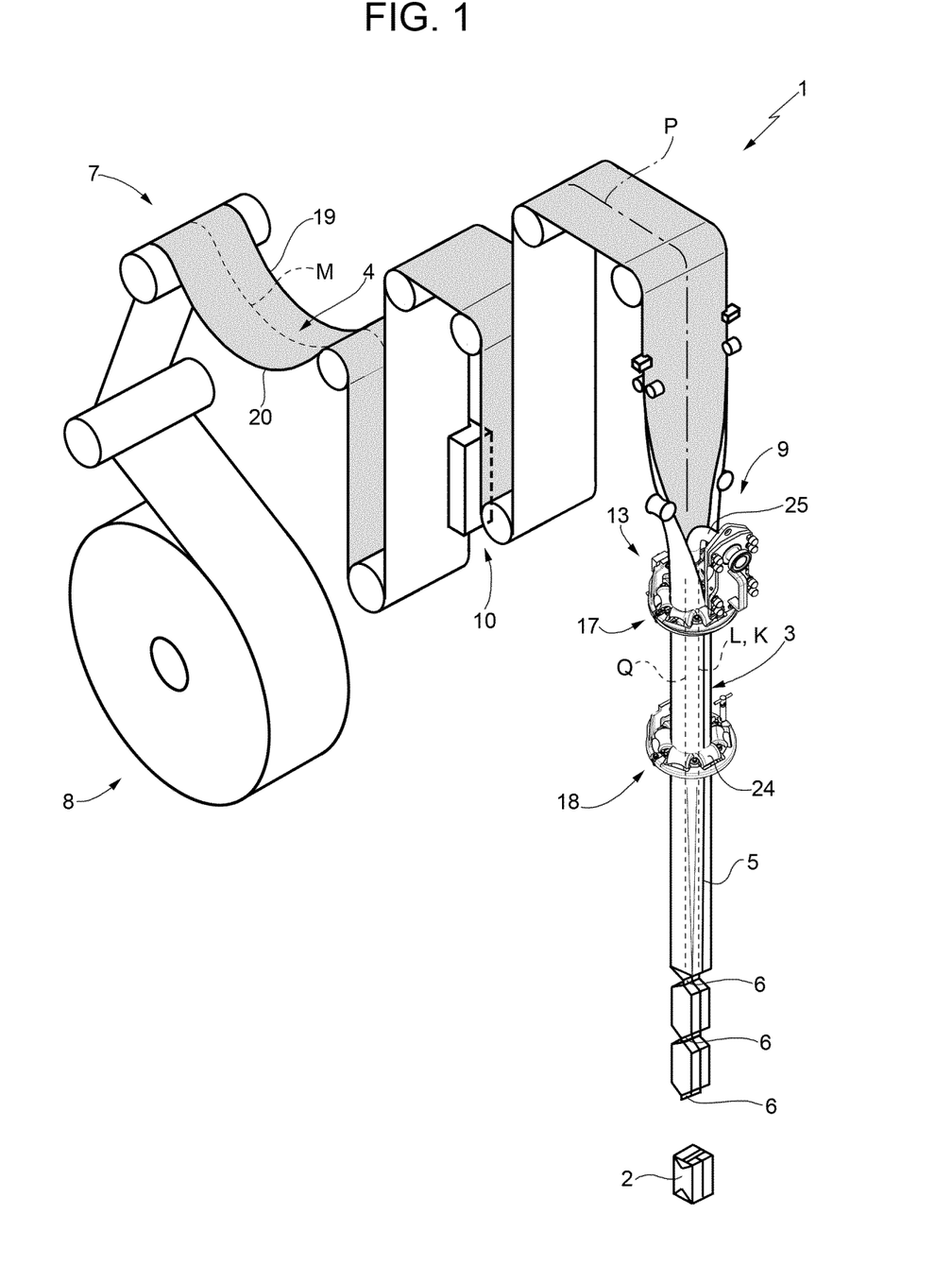
FIG. 1 a schematic view of a packaging machine having a strip application apparatus according to the present invention, with parts removed for clarity.

Number 1 indicates as a whole a packaging machine for producing sealed packages 2 of a pourable food product, such as pasteurized milk or fruit juice, from a tube 3 of a web 4 of packaging material. In particular, in use, tube 3 extends along a longitudinal axis L, in particular, axis L having a vertical orientation.

Web 4 of packaging material has a multilayer structure (not shown), and comprises a layer of fibrous material, normally paper, covered on both sides with respective layers of heat-seal plastic material, e.g. polyethylene.

Preferably, web 4 also comprises a layer of gas- and light-barrier material, e.g. aluminum foil or ethylene vinyl alcohol (EVOH) film, and at least a first layer and a second layer of heat-seal plastic material. The layer of gas- and light-barrier material is superimposed on the first layer of heat-seal plastic material, and is in turn covered with the second layer of heat-seal plastic material. The second layer of heat-seal plastic material forms the inner face of package 2 eventually contacting the food product.

Figure 2:
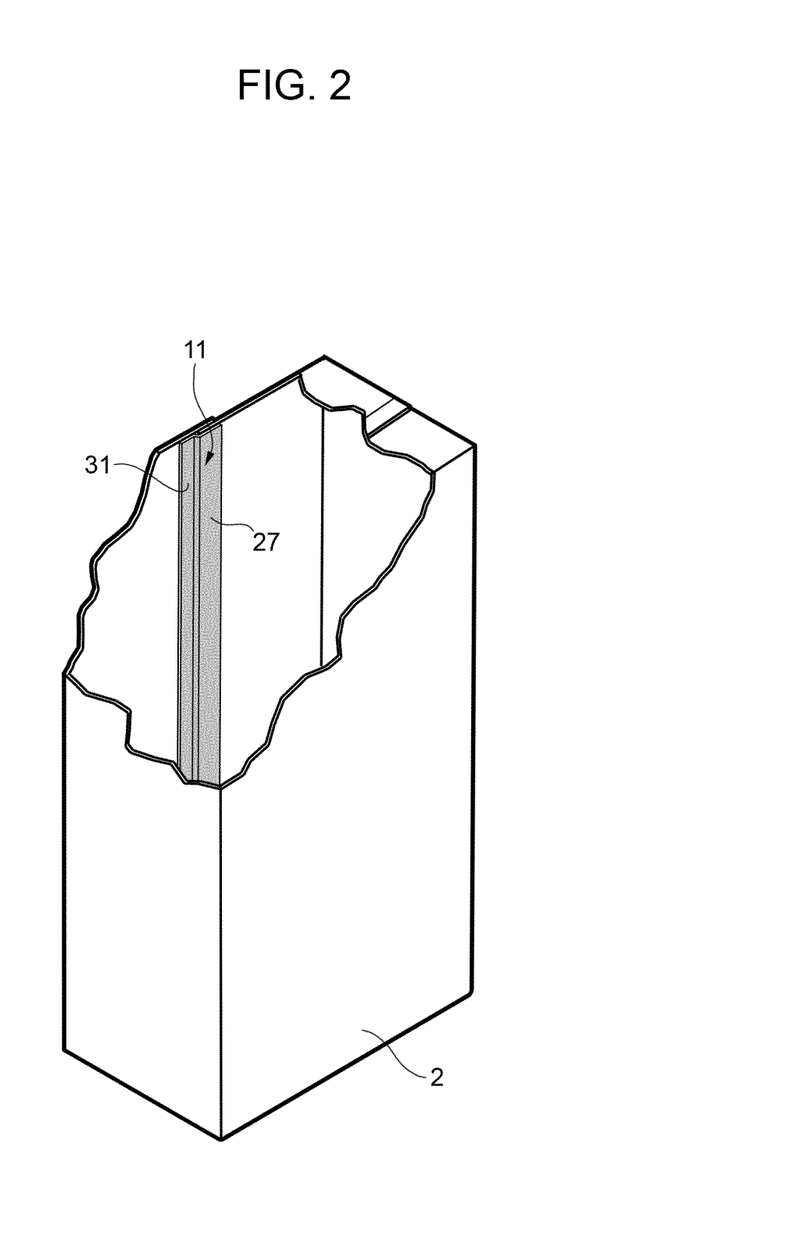
FIG. 2 is a schematic and perspective view of a package obtained during operation of the packaging apparatus of FIG. 1, with parts removed for clarity.

A typical package 2 obtained by packaging machine 1 comprises a longitudinal seam portion 5 and a pair of transversal seal portions 6, in particular a pair of top and bottom transversal seal portions 6 (i.e. one seal portion 6 at an upper portion of package 2 and another seal portion 6 at a lower portion of package 2).

With particular reference to FIG. 1, packaging machine 1 comprises:
  conveying means 7 for advancing in a known manner web 4 along its longitudinal axis M along a web advancement path P from a delivery station 8 to a forming station 9, at which, in use, the web 4 is formed into tube 3;
  a strip application apparatus 10 for applying a sealing strip 11 of a heat-sealable material, in particular a heat-sealable plastic material, at a strip application station 12 downstream of delivery station 8 and upstream of forming station 9 along path P;
  a tube forming device 13 extending along a longitudinal axis K, in particular having a vertical orientation, and being adapted to form and longitudinally seal tube 3 from the, in use, advancing web 4;
  filling means for continuously filling tube 3 with the pourable product; and
  a package forming unit (not shown and known as such) adapted to at least form and transversally seal the, in use, advancing tube 3 for forming packages 2, in particular also being adapted to transversally cut the, in use, advancing tube 3 for forming packages 2.

Preferably, packaging machine 1 also comprises a sterilizing unit (not shown and known as such) adapted to sterilize the, in use, advancing web 4 at a sterilization station, in particular the sterilization station being arranged upstream of forming station 9 along path P.

Preferably, conveying means 7 are associated to strip application apparatus 10.

Preferentially, conveying means 7 are also adapted to advance tube 3 and any intermediate of tube 3 in a manner known as such along a tube advancement path Q, in particular from forming station 9 to the package forming unit.

In particular, with the wording intermediates of tube 3 any configuration of web 4 is meant prior to obtaining the tube structure and after the beginning of the folding operation of web 4 by tube forming device 13. In other words, the intermediates of tube 3 are a result of the gradual folding of web 4 so as to obtain tube 3, in particular by overlapping a first longitudinal edge 19 of web 4 and a second longitudinal edge 20 of web 4, opposite of first longitudinal edge 19, with one another. As will be described further below, overlapping of longitudinal edge 19 and longitudinal edge 20 occurs with sealing strip 11 having been sealed to longitudinal edge 19.

In more detail, tube forming device 13 determines, in use, axis L of tube 3, in particular axis L and axis K being parallel to one another.

Preferentially, tube forming device 13 comprises at least two forming ring assemblies 17 and 18 being adapted to fold in cooperation with one another web 4 gradually into tube 3, in particular by overlapping first longitudinal edge 19 and second longitudinal 20 of web 4 with one another for forming seam portion 5 of tube 3. In the specific case shown, forming ring assembly 18 is arranged downstream of forming ring assembly 17 along tube advancement path Q.

In particular, each one of forming ring assemblies 17 and 18 substantially lies within a respective plane, in particular each plane being orthogonal to axis K, even more particular each respective plane having a substantially horizontal orientation.

Even more particular, forming ring assembly 17 and forming ring assembly 18 are spaced apart from and parallel to one another (i.e. the respective planes are parallel to and spaced apart from one another).

Preferentially, each plane is orthogonal to axis K and to axis L.

Furthermore, forming ring assemblies 17 and 18 are arranged coaxial to one another. In particular, forming ring assemblies 17 and 18 define longitudinal axis K of tube forming device 13.

More specifically, each forming ring assembly 17 and 18 comprises a respective support ring and a plurality of respective bending rollers mounted onto the respective support ring. In particular, the respective bending rollers are configured to interact with web 4 and/or tube 3 and/or any intermediates of tube 3 for forming tube 3. Even more particular, the respective bending rollers define respective apertures through which, in use, tube 3 and/or the intermediates of tube 3 advance.

Packaging machine 1 also comprises a longitudinal sealing device that is adapted to longitudinally seal tube 3 along seam portion 5.

Furthermore, the sealing device comprises a sealing head (not shown and known as such) adapted to interact with tube 3, in particular with seam portion 5 for longitudinally sealing tube 3. In particular, the sealing head is adapted to heat tube 3, in particular along seam portion 5. The sealing head can be of any type adapted to heat tube 3, in particular seam portion 5. In particular, the sealing head can be of the kind operating by means of induction heating or by a stream of a hot fluid or by means of ultrasound.

In more detail, the sealing head is arranged substantially between forming ring assemblies 17 and 18 (i.e. the sealing head is arranged between the respective planes of forming ring assemblies 17 and 18).

Preferably, the longitudinal sealing device also comprises a pressuring assembly (only partially shown) adapted to exert a mechanical force on tube 3, in particular on the substantially overlapping edges 19 and 20, even more particular onto seam portion 5 of tube 3 so as to ensure sealing of tube 3 along seam portion 5.

In particular, the pressuring assembly comprises at least an interaction roller 24 and a counter-interaction roller (not shown) adapted to exert the mechanical force onto seam portion 5 from opposite sides thereof. In particular, in use, the seam portion of tube 3 is interposed between interaction roller 24 and the counter-interaction roller.

Preferentially, the interaction roller 24 is supported by forming ring assembly 18.

In more detail, the filling means comprise a filling pipe 25 being in fluid connection with a pourable product storage tank (not shown and known as such) for storing/providing for the pourable product to be packaged.

In particular, filling pipe 25 is adapted to direct, in use, the pourable product into tube 3.

Preferentially, filling pipe 25 is, in use, at least partially placed within tube 3 for continuously feeding the pourable product into tube 3.

In particular, filling pipe 25 has a L-shaped configuration arranged in such a manner that a linear main pipe portion of filling pipe 25 extends within tube 3, in particular parallel to axis K and axis L.

With particular reference to FIGS. 2 to 5, strip application apparatus 10 comprises:
- an application device 26 adapted to apply a first longitudinal portion 27 of sealing strip 11 onto longitudinal edge 19;
- a strip sealing device 28 adapted to seal first longitudinal portion 27 to web 4, in particular longitudinal edge 19;
- at least one reference marker 29, in particular provided in the proximity of strip sealing device 28, even more particular provided at sealing device 28;
- an imaging device 30 adapted to image at least a second longitudinal portion 31 of sealing strip 11 projecting laterally from longitudinal edge 19 and reference marker 29; and
- a control device adapted to at least determine a correct alignment or a misalignment of sealing strip 11 with respect to web 4.

Preferably, strip application apparatus 10 also comprises an alignment device 33 adapted to vary the relative position and/or alignment of sealing strip 11 with respect to web 4. In other words, alignment device 33 is adapted to position and/or align sealing strip 11 with respect to web 4.

In particular, sealing strip 11 applied onto web 4 extends along a longitudinal axis N.

Preferentially, longitudinal axis N is substantially parallel to axis M, in particular with sealing strip 11 being correctly aligned with respect to web 4.

Preferably, strip application apparatus 10 further comprises a positioning device (not specifically shown) adapted to vary the relative position and/or alignment of reference marker 29 and web 4 with one another.

In particular, the positioning device is adapted to position and/or align web 4 with respect to reference marker 29.

Even more particular, the positioning device is also adapted to vary the relative position and/or alignment of reference marker 29 and sealing strip 11, in particular with longitudinal portion 27 being applied to web 4.

With particular reference to FIGS. 2 to 5, application device 26 is adapted to advance, in particular to continuously advance, sealing strip 11 along a strip advancement path R, in particular from a storing station 34 to at least application station 12 at which longitudinal portion 27 is applied onto web 4.

Furthermore, in use, after application of strip 11 to web 4 strip 11 further advances from application station 12 together with web 4.

Figure 3:
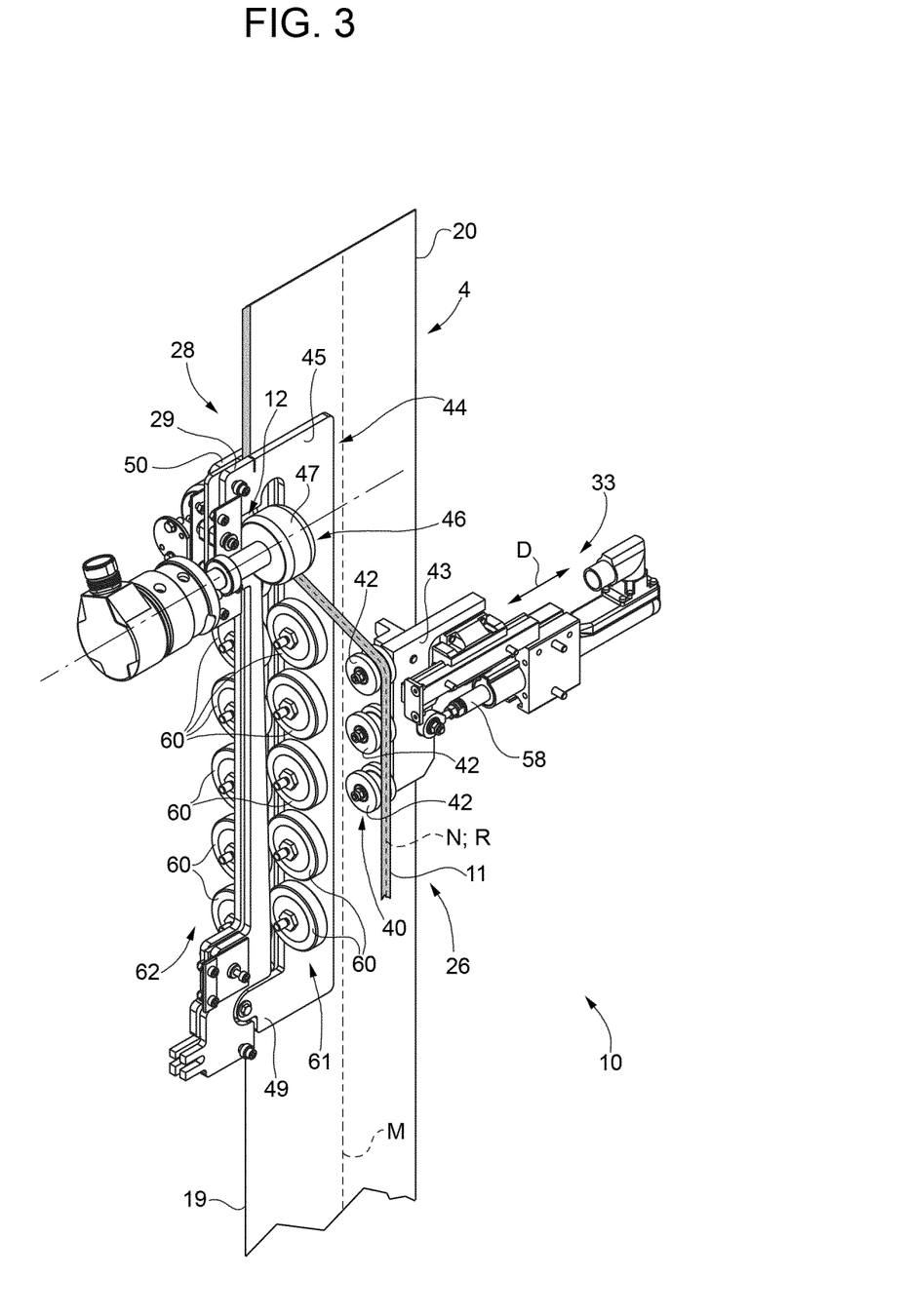
FIG. 3 shows a perspective view of details of a strip application apparatus according to the present invention, with parts removed for clarity.
Figure 4:
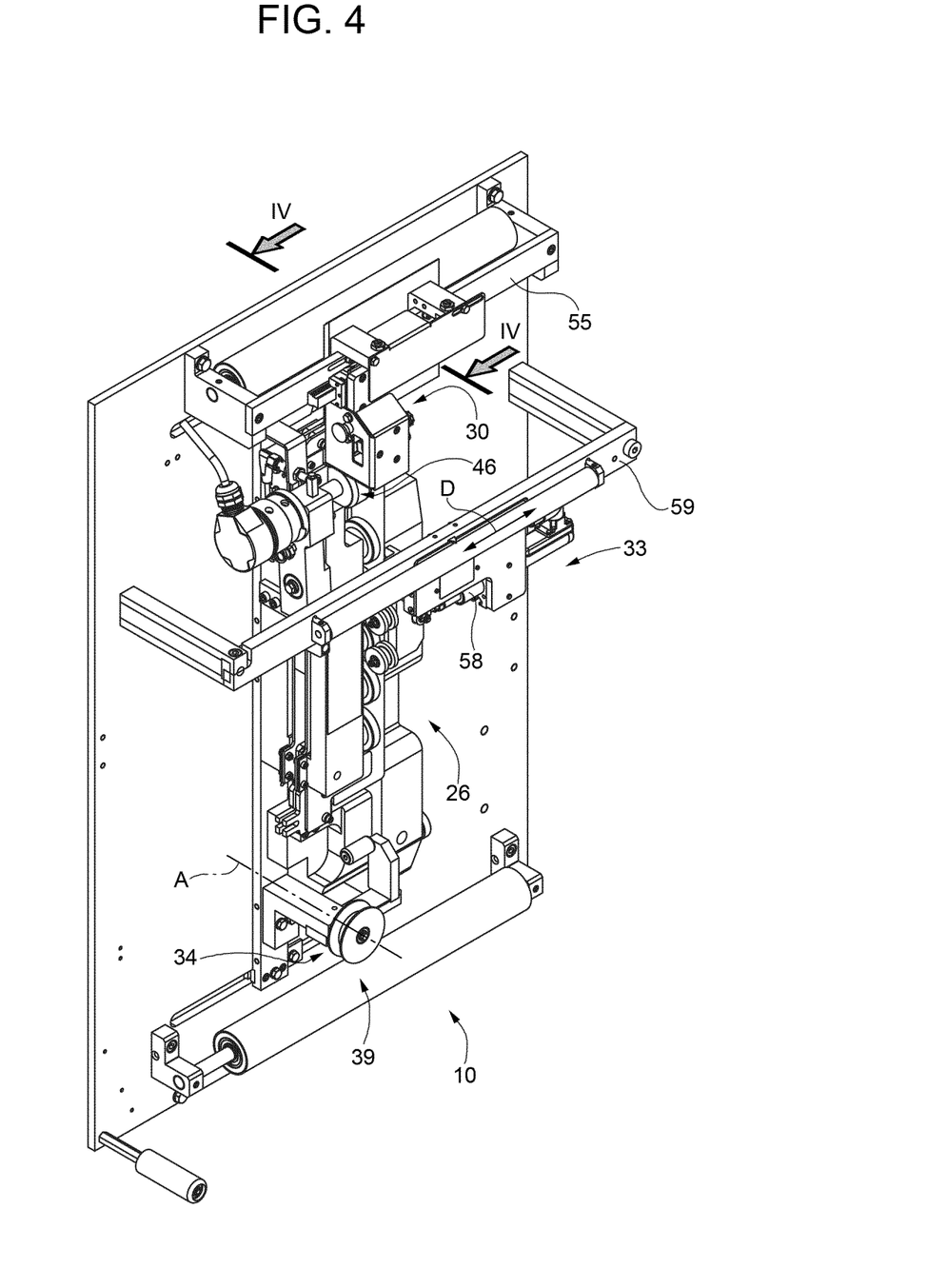
FIG. 4 shows a perspective side view of the strip application apparatus of FIG. 3, with parts removed for clarity.

In more detail, application device 26 comprises:
- a magazine unit 39 arranged at storing station 34 and being adapted to store sealing strip 11; and
- an advancement group 40 for advancing sealing strip 11 along path R, in particular along longitudinal axis N.

In even further detail, magazine unit 39 comprises a support reel 41 adapted to carry sealing strip 11 in a wound-up manner and being rotatable around an axis A, in particular axis A being orthogonal to advancement path P, even more particular being orthogonal to, in use, advancing web 4.

In even further detail, advancement group 40 comprises at least one, preferably a plurality of guide rollers 42 adapted to guide sealing strip 11 to application station 12. In particular, guide roller or guide rollers 42 are adapted to rotate around a respective central axis, in particular being orthogonal to axis A.

More specifically, as will be explained further below in more detail, guide roller or guide rollers 42 are adapted to guide sealing strip 11 to application station 12 in collaboration with strip sealing device 28.

With particular reference to FIGS. 3 and 4, application device 26 also comprises a support base 43 supporting guide roller or guide rollers 42.

Preferably, support base 43 is coupled to alignment device 33 and is adapted to move, in particular by actuation through alignment device 33, along a rectilinear direction D.

Figure 5:
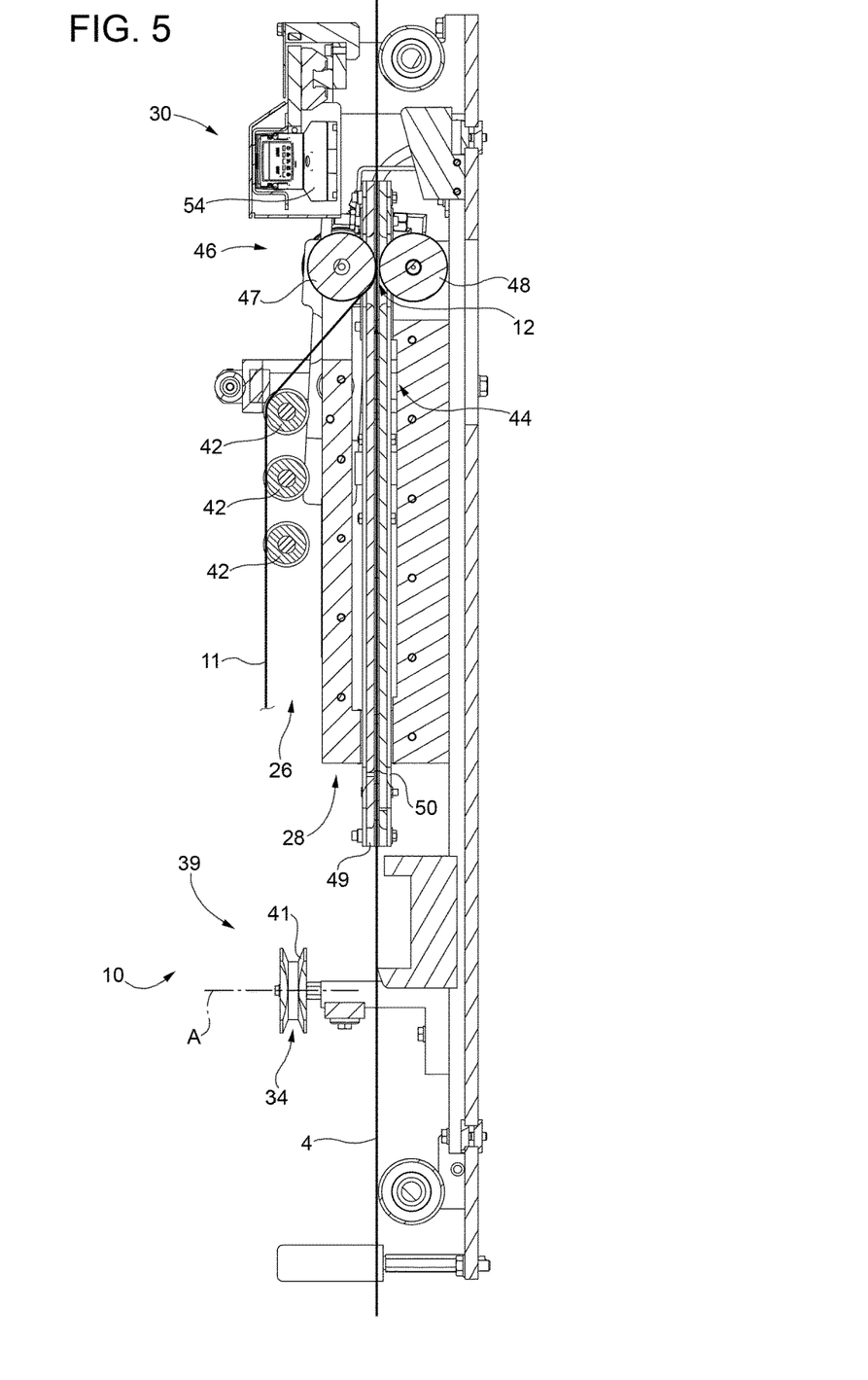
FIG. 5 shows a sectionized view along section IV-IV of FIG. 4, with parts removed for clarity.

With particular reference to FIGS. 3 and 5, strip sealing device 28 is adapted to seal sealing strip 11, in particular longitudinal portion 27, to web 4, in particular longitudinal edge 19, by heating web 4, in particular longitudinal edge 19, and/or sealing strip 11, in particular longitudinal portion 27, and by pressing sealing strip 11, in particular longitudinal portion 27, and web 4, in particular longitudinal edge 19, to one another.

In particular, sealing device 28 can be of any kind suitable to heat web 4 and/or sealing strip 11. For example sealing device 28 can be of the type heating by means of induction or by means of a hot fluid, such as hot air.

In more detail, sealing device 28 comprises at least a sealing head 44 adapted to heat web 4, in particular longitudinal edge 19, and/or sealing strip 11, in particular longitudinal portion 27.

In a preferred non-limiting embodiment, sealing head 44 is adapted to heat web 4, in particular longitudinal edge 19.

Preferably, sealing head 28 is provided with reference marker 29. In particular, reference marker 29 is provided within an end portion 45 of sealing head 44.

In a preferred non-limiting embodiment, reference marker 29 is defined by a slit provided within sealing head 44, in particular end portion 45.

Preferably, sealing device 28 also comprises a pressuring assembly 46, in particular arranged at application station 12, and being adapted to press sealing strip 11 in particular longitudinal portion 27, and web 4, in particular longitudinal edge 19, to one another, in particular for guaranteeing a secure sealing of longitudinal portion 27 to longitudinal edge 19.

More specifically, pressuring assembly 46 comprises a main roller 47 and an auxiliary roller 48 adapted to contact, in use, sealing strip 11, in particular longitudinal portion 27, and web 4, in particular longitudinal edge 19. In use, web 4, in particular longitudinal edge 19, and sealing strip 11, in particular longitudinal portion 27, are interposed between main roller 47 and auxiliary roller 48.

Preferably, main roller 47 is, in use, actively driven.

Preferably, main roller 47 and auxiliary roller 48 are configured to collaborate with guide rollers 42 for defining at least a portion of path R.

With particular reference to FIGS. 3 and 5, sealing head 44 comprises a sealing space through which, in use, at least a section of web 4, in particular the section including longitudinal edge 19, and at least a section of sealing strip 11, in particular the section including longitudinal portion 27, advance.

In the example shown in FIGS. 3 and 5, sealing head 44 comprises a first sealing plate 49 and a second sealing plate 50 arranged adjacent and spaced apart from one another so as to define the sealing space. In particular, first sealing plate 49 and second sealing plate 50 are substantially parallel to one another. Preferentially, first sealing plate 49 faces imaging device 30 and carries reference marker 29.

With particular reference to FIG. 3, sealing device 28 also comprises a plurality of wheels 60 adapted to support maintenance of the alignment and/or positioning of web 4 with respect to sealing head 44.

Preferentially, sealing device 28 comprises a first group 61 of wheels 60 and a second group 62 of wheels 60.

In particular, the respective wheels 60 of respectively first group 61 and second group 62 are arranged in succession with one another.

Furthermore, the respective wheels 60 of respectively first group 61 and second group 62 are configured to contact, in use, web 4 from opposite sides thereof.

With particular reference to FIGS. 4 and 5, imaging device 30 is adapted to continuously image at least longitudinal portion 31 of sealing strip 11 and reference marker 29.

Advantageously, imaging device 30 is configured to acquire at least one image (see FIG. 6) of at least longitudinal portion 31 and reference marker 29.

Figure 6:
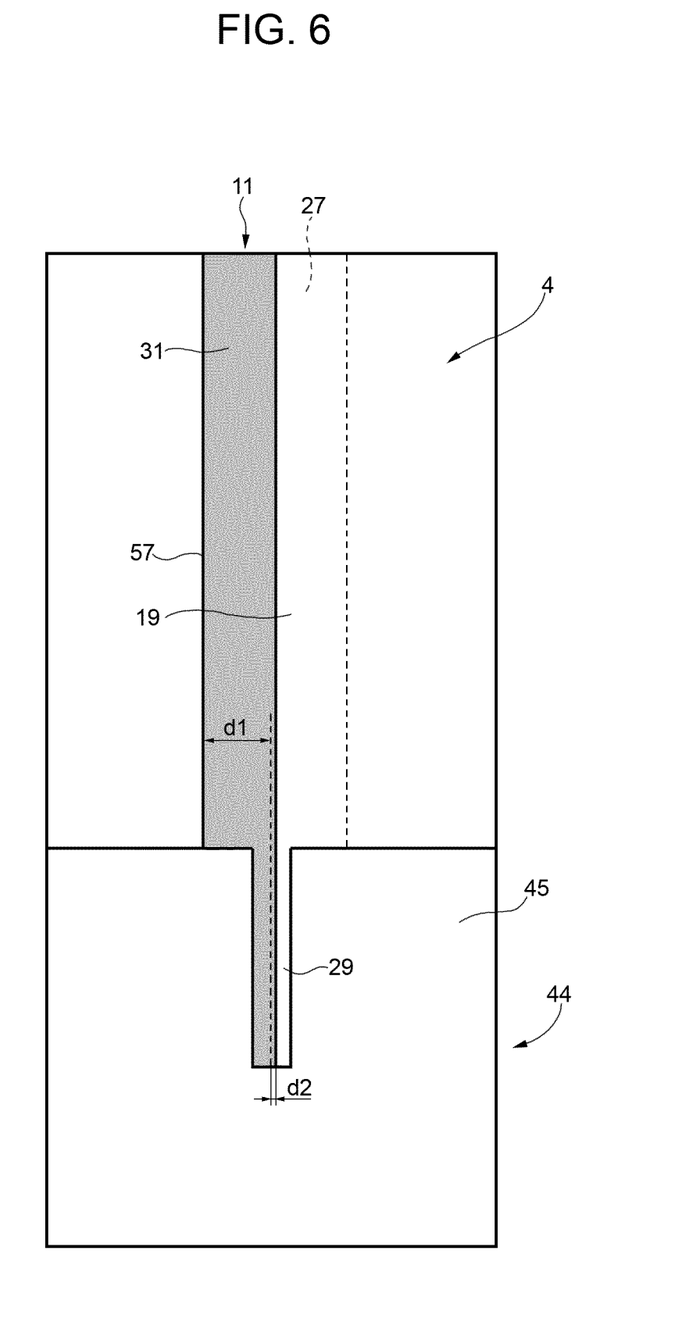
FIG. 6 shows a schematic view of an image obtainable by an imaging device of the strip application apparatus, with parts removed for clarity.

More specifically, imaging device 30 is configured to acquire at least one image of at least longitudinal portion 31 and end portion 45 including reference marker 29.

Preferably, imaging device 30 is configured to acquire a plurality of images at a defined rate, in particular the rate being in the millisecond range, even more particular at a rate of approximately 20 ms.

Preferably, imaging device 30 is also adapted to image longitudinal edge 19 and, preferentially, the image acquired contains also longitudinal edge 19.

Advantageously, imaging device 30 is configured to cover the transversal extension of sealing strip 11. In other words, the full transversal extension of longitudinal portion 31 is imaged.

A typical image is illustrated in FIG. 6. The image shows longitudinal portion 31, a section of web 4 including longitudinal edge 19 and end portion 45 together with reference marker 29. For reasons of simplifying the explanation of the function of strip application apparatus 10, in particular imaging device and the control device, longitudinal portion 27 of sealing strip 11 is indicated by a dotted line. In use, the image does not allow to identify longitudinal portion 27.

In the example of FIG. 5, imaging device 30 comprises at least a vision sensor, in particular a camera 54, adapted to image at least longitudinal portion 27 and reference marker 29, preferably also longitudinal portion 19, even more preferably also longitudinal portion 19 and end portion 45.

Preferably, camera 54 is arranged downstream of application station 12.

More specifically, camera 54 is moveable so as to adjust the display window, i.e. the exact section of sealing strip 11, web 4 and sealing head 44 which will be present on the acquired image(s).

In more detail, camera 54 is slidingly mounted to a support structure so as to be moveable along a rectilinear direction transversal to path P (and longitudinal axis M). In other words, camera 54 is mounted such to be moveable along the transversal extension of web 4.

In particular, camera 54 is mounted to a transversal support bar 55 arranged transversal, in particular perpendicular, with respect to path P.

Preferentially, imaging device 30 also comprises a light source adapted to illuminate at least longitudinal portion 27 and reference marker 29, preferably also longitudinal portion 19, even more preferably also longitudinal portion 19 and end portion 45. In particular, the light source can be adapted to function in a backlight mode or a frontlight mode.

As already stated above, the control device is adapted to determine at least a correct alignment or a misalignment of sealing strip 11 with respect to web 4. This is important for guaranteeing that sealing strip 11 as present in a finally formed and filled package correctly fulfills its scope, namely to at least avoid contact of longitudinal edge 19 with the pourable product.

Thus, the determination of a correct alignment or a misalignment allows to at least determine packages to be expelled from distribution as presenting a misaligned sealing strip 11.

When sealing strip 11 is correctly aligned and/or positioned with respect to web 4, axis N is substantially parallel to axis M. In other words, a correct alignment of sealing strip 11 with respect to web 4 is such that sealing strip 11 and web 4 are substantially parallel to one another, in particular upstream of application station 12 along respectively path P and path R.

Furthermore, longitudinal portion 31 should have a transversal extension (in other words, a width) which lies within a defined distance range. In other words, longitudinal portion 31, which projects away from web 4, in particular longitudinal edge 19, should have a width lying with the given range. This ensures that longitudinal portion 27 has a transversal extension sufficiently large to ensure a secure sealing to longitudinal edge 19 and longitudinal portion 31 has a transversal extension sufficiently large to ensure that longitudinal portion 31 can be securely sealed to the inner of tube 3 during folding of web 4 to obtain tube 3 and during the longitudinally sealing of tube 3 along seam portion 5.

Thus, not necessarily the sealing strip 11 is correctly aligned and/or positioned with respect to web 4 if axis N and axis M are substantially parallel to one another. A correct alignment also requires that the transversal extension (the width) of longitudinal portion 27 lies within the respective defined range and, consequently, also the transversal extension (the width) of longitudinal portion 31 lies within the respective defined range.

Thus, within the meaning of the present patent application with a correct alignment of sealing strip 11 with respect to web 4 is meant that axis N and axis M are substantially parallel to one another (sealing strip 11 and web 4 are substantially parallel to one another) and longitudinal portion 27 and longitudinal portion 31 have respective transversal extensions (widths) lying within the respective defined ranges.

Advantageously, the control device is configured to determine a correct alignment or a misalignment based on the relative position and/or alignment of sealing strip 11, in particular longitudinal portion 31 with respect to reference marker 29.

Advantageously, the control device is configured, in particular by means of software:
to determine a first transversal distance d1 (see FIG. 6) between the reference marker and a longitudinal border 57 of longitudinal portion 31 opposite to longitudinal edge 19; and
to evaluate a correct alignment or a misalignment of the sealing strip as a function of at least transversal distance d1.

In other words, transversal distance d1 reflects the transversal distance between reference marker 29 and border 57.

Even more particular, in the specific example embodiment disclosed, reference marker 29 is defined by a slit provided with sealing head 44, in particular within end portion 45.

In the specific example shown in FIG. 6, distance d1 is determined from the center of the slit and border 57 (i.e. the reference is defined by the center of the slit). Alternatively, also one of the edges of the slit could be used as a reference for the determination of distance d1.

Preferentially, the control device is configured to evaluate a correct alignment or misalignment of sealing strip 11 with respect to web 4 based on, in use, successively acquired images and a succession of determined distances d1.

Preferentially, the control device is configured to compare distance d1 or distances d1 determined to a predetermined distance range.

In one non-limiting embodiment, the control device is configured to determine a correct alignment if the determined distance d1 or the distances d1 lies or lie within the predetermined distance range; and to determine a misalignment if the determined distance d1 or the determined distances d1 lies or lie outside of the predetermined distance range.

Preferentially, the control unit is also configured:
to analyze the at least one image, in particular containing also longitudinal edge 19, such to determine a second transversal distance d2 between reference marker 29 and longitudinal edge 19; and
to evaluate the correct alignment or the misalignment of sealing strip 11 with respect to web 4 as a function of distance d1 and distance d2.

Preferentially, the control device is configured to analyze images successively acquired so as to determine successive distances d2.

In particular, in the specific example shown in FIG. 6, distance d2 is determined between the center of the slit, which defines the reference, and the longitudinal edge 19.

By determining distance d2 or distances d2, the control device is configured to consider possible lateral fluctuations of the position and/or alignment of web 4, which reciprocally has an influence on distance d1. Thus, preferably, the control device is configured to determine the correct alignment or the misalignment based on both distance d1 and distance d2 or respectively distances d1 and distances d2.

Furthermore, in this preferred embodiment, the control device is configured to evaluate a correct alignment and/or positioning of web 4 with respect to reference marker 29, in particular with respect to sealing head 44.

The evaluation of the correct alignment and/or positioning of web 4 with respect to reference marker 29 allows in the specific case to determine whether the sealing of sealing strip 11, in particular longitudinal portion 27, to web 4, in particular to longitudinal edge 19, occurs in the correct manner.

Preferably, the control device is configured to control alignment device 33, in particular for controlling the relative alignment and/or positioning of sealing strip 11 with respect to web 4.

In particular, the control device is configured to control alignment device 33 so as to vary the relative alignment of sealing strip 11 with respect to web 4 in case of a misalignment of sealing strip 11 with respect to web 4.

Preferentially, the control device is also configured to control the positioning device, in particular for controlling the relative alignment and/or positioning of web 4 with respect to reference marker 29, in particular sealing head 44.

In particular, the control device is configured to control the positioning device so as to vary the relative alignment and/or positioning of web 4 with respect to reference marker 29, in particular sealing head 44, in case of a misalignment of web 4 with respect to reference marker 29.

With particular reference to FIGS. 3 and 4, alignment device 33 is adapted to move, in use, sealing strip 11 along direction D, in particular orthogonal, to web advancement path P (i.e. the rectilinear direction along which guide rollers 42 are moveable, is parallel to the transversal extension of advancing web 4).

In particular, alignment device 33 is at least indirectly coupled to guide rollers 42, and is adapted to move guide rollers 42 along direction D, in particular by being connected to support base 43.

In more detail, alignment device 33 comprises a linear actuator, in particular a linear motor 58 at least indirectly coupled to guide rollers 42, in particular connected to support base 43.

More specifically, the linear actuator, in particular linear motor 58, is controllable by the control device and is adapted to move guide rollers 42 along direction D.

In even more detail, the linear actuator, in particular linear motor 58, is mounted to a support frame 59 of apparatus 10.

In one non-limiting embodiment, the positioning device is adapted to cooperate with conveying means 7 and/or with sealing head 44 so as to change the relative alignment and/or positioning of web 4 with respect to reference marker 29, in particular with respect to sealing head 44.

In use, packaging machine 1 forms packages 2 filled with the pourable product. In particular, packaging machine 1 forms packages 2 from tube 3 formed from web 4, tube 3 being continuously filled with the pourable product.

In more detail, operation of packaging machine 1 comprises:
- a conveying phase for advancing web 4 along path P;
- a strip application macro-phase during which sealing strip 11, in particular longitudinal portion 27, is applied onto web 4, in particular onto longitudinal edge 19;
- a tube forming and sealing phase during which web 4 is formed into tube 3 and tube 3 is longitudinally sealed, in particular along seam portion 5;
- a tube advancement phase during which tube 3 is advanced along tube advancement path Q;
- a filling phase during which the pourable product is continuously filled into tube 3; and
- a package forming phase during which packages 2 are formed from tube 3, in particular by shaping (respective (lower) portions) of tube 3 and transversally sealing and cutting tube 3.

In further detail, the tube forming and sealing phase comprises the phase of gradually overlapping edges 19 and 20 with one another for forming seam portion 5 and the phase of longitudinally sealing tube 3, in particular seam portion 5.

During the forming and sealing phase, tube 3 is formed from web 4 such that sealing strip 11 is aligned within tube 3. In particular, longitudinal portion 27 has already been sealed to first longitudinal edge 19 during the strip application macro-phase and longitudinal portion 31 becomes sealed to web 4 in the proximity of longitudinal edge 20 (see FIG. 2) during the forming and sealing phase.

In more detail, the strip application macro-phase comprises at least the following phases:
- the conveying phase for advancing web 4 along path P;
- an application phase during which longitudinal portion 27 is applied onto longitudinal edge 19;
- a sealing phase during which longitudinal portion 27 is sealed onto longitudinal edge 19; and
- a control phase during which at least the correct alignment or the misalignment of sealing strip 11 with respect to web 4 is detected and/or determined.

Preferably, the strip application macro-phase also comprises a marking phase during which the zones of web 4 at which sealing strip 11 is misaligned are marked, in particular digitally marked, and/or the zones of the web 4 at which sealing strip 11 has a correct alignment are marked, in particular digitally marked.

The marking allows to identify the final packages 2 having a misaligned and/or wrongly positioned sealing strip 11 (or more precisely, the section of sealing strip 11 that is associated to one respective package 2 after transversal sealing and cutting of tube 3) so as to discard these from distribution.

Preferably, the strip application marco-phase also comprises a correction phase being executed during the application phase if during the control phase a misalignment of sealing strip 11 with respect to web 4 is detected or determined.

In more detail, during the correction phase the relative alignment of sealing strip 11 with respect to web 4 is altered so as to obtain a correct alignment of sealing strip 11 with respect to web 4.

Preferentially during the correction phase strip advancement path R and/or web advancement path P is or are varied so as to change the relative alignment of sealing strip 11 with respect to web 4.

In a preferred non-limiting embodiment, during the correction phase alignment device 33 is activated by the control device so as to alter strip advancement path R, in particular by moving guide rollers 42 along direction D.

In more detail, the application phase comprises at least the following sub-phases:
- an advancement sub-phase during which sealing strip 11 is advanced along path R; and
- a placement sub-phase during which sealing strip 11 is placed on longitudinal edge 19 of the advancing web 4.

In particular, during the advancement sub-phase strip 11 advances from storing station 34 to application station 12.

Preferably, during the advancement sub-phase sealing strip 11 is at least partially guided to application station 12 by guide rollers 42. In particular, strip 11 is guided to application station 12 by cooperation of guide rollers 42 with pressuring assembly 46.

During the sealing phase, strip sealing device 28 heats web 4, in particular longitudinal edge 19, and/or sealing strip 11, in particular longitudinal portion 27 and exerts a pressure onto web 4, in particular longitudinal edge 19, and/or sealing strip 11, in particular longitudinal portion 27.

In more detail, during the sealing phase sealing head 44 heats longitudinal edge 19 and/or longitudinal portion 27; and pressuring assembly 46 exerts the pressure onto longitudinal edge 19 and longitudinal portion 27 for securely sealing longitudinal portion 27 to longitudinal edge 19.

The control phase comprises at least the following sub-phases:
- an imaging sub-phase during which at least one image of at least longitudinal portion 31 and at least reference marker 29 is acquired;
- a determination sub-phase during which the acquired image is analyzed to determine at least transversal distance d1; and
- an analysis sub-phase during which the correct alignment or the misalignment is evaluated as a function of at least transversal distance d1.

In one non-limiting embodiment, during the analysis sub-phase distance d1 is compared to a predetermined distance range and a correct alignment is determined if the determined distance lies within the predetermined distance range and a misalignment is determined if the determined distance lies outside of the predetermined distance range.

Preferably, during the imaging sub-phase also end portion 45 is imaged such that the image contains also at least end portion 45 together with reference marker 29.

Preferentially, during the imaging sub-phase also longitudinal edge 19 is imaged so that the acquired image also contains longitudinal edge 19. Then, during the determination sub-phase also transversal distance d2 is determined; and during the analysis sub-phase at least the correct alignment or the misalignment of sealing strip 11 with respect to web 4 is evaluated as a function of transversal distance d1 and transversal distance d2.

In one non-limiting embodiment, during the analysis sub-phase the sum of distance d1 and distance d2 is compared to a predetermined range. If the sum lies within the predetermined range the alignment between strip 11 and web 4 is determined to be correct and if the sum lies outside of the predetermined range a misalignment between strip 11 and web 4 is determined.

Preferentially, during the analysis sub-phase also the relative alignment of web 4 and reference marker 29, in particular sealing head 44 is evaluated and a correct relative alignment or a misalignment of web 4 and the reference marker 29, in particular sealing head 44, is evaluated as a function of the second transversal distance d2.

In the preferred non-limiting embodiment, longitudinal edge 19 is to advance such that the second transversal distance d2 between the center of reference marker 29 and longitudinal edge 19 is substantially zero.

If there is a misalignment between web 4 and reference marker 29, in particular sealing head 44, an adjustment phase is to be executed during which the relative alignment of web 4 and reference marker 29, in particular sealing head 44, is varied in such a manner to obtain a correct alignment.

During the adjustment phase the positioning device is activated by the control device, in particular so as to modify path P.

Preferentially, the imaging sub-phase, the determination sub-phase and the analysis sub-phase are continuously executed.

In particular, during the imaging sub-phase successive images of at least the reference marker 29 and longitudinal portion 27, in particular also of longitudinal edge 19, even more particular also of longitudinal edge 19 and end portion 45 are acquired. Then, for each image acquired the respective determination sub-phase and analysis sub-phase is executed.

Furthermore, a correct alignment or a misalignment of sealing strip 11 with respect to web 4 is evaluated based on the determination of a series of distances d1, preferentially it is evaluated based on the determination of a series of distances d1 and the respective distances d2.

The advantages of packaging machine 1 according to the present invention will be clear from the foregoing description.

In particular, strip application apparatus 10 allows to determine with high quality a possible misalignment of sealing strip 11 with respect to web 4 by reference to a reference marker 29. This allows to determine these packages 2, which need to be removed from distribution.

Furthermore, apparatus 10 is provided with the possibility to correct the relative alignment of strip 11 with respect to web 4 such that the package production process does not need to be interrupted, but any misalignment is immediately compensated for. Thus, only a limited number of packages 2 need to be discarded from distribution without interruption of the packaging process.

A further advantage lies within the determination of the relative alignment and/or position of web 4 with respect to reference marker 29 further improving the determination of the alignment of sealing strip 11 with respect to web 4.

An even further advantage can be seen in providing the sealing head 44 with reference marker 29 permitting to also determine the relative alignment and/or position of web 4 with respect to sealing head 44. In the case of a misalignment it is possible to correct the alignment so as to guarantee a secure sealing of sealing strip 11 to web 4.

Another advantage lies within the constant and accurate control of the alignment of the sealing strip and/or the web of packaging material with respect to the sealing head of the sealing device by relying on the reference marker 29 as a reference allowing thereby guarantying a secure sealing of the sealing strip to the web of packaging material.

Clearly, changes may be made to apparatus 1 as described herein without, however, departing from the scope of protection as defined in the accompanying claims.

The invention claimed is:

1. A method of applying a sealing strip of heat seal material onto a web of packaging material within a strip application apparatus comprising:
   - a conveying phase during which the web of packaging material is advanced along a web advancement path;
   - an application phase during which a first longitudinal portion of the sealing strip is applied onto a longitudinal edge of the web of packaging material advancing, in use, along the web advancement path;
   - a sealing phase during which the first longitudinal portion of the sealing strip is sealed onto the longitudinal edge;
   - a control phase during which at least a correct alignment or a misalignment of the sealing strip with respect to the web of packaging material is detected and/or determined;

wherein the control phase comprises at least the following sub-phases:
   - an imaging sub-phase during which an image of at least a second longitudinal portion of the sealing strip projecting laterally from the longitudinal edge and at least one reference marker of the strip application apparatus is acquired;
   - a determination sub-phase during which the acquired image is analyzed to determine at least a first transversal distance between the reference marker and a longitudinal border of the second longitudinal portion opposite to the longitudinal edge of the web of packaging material;

an analysis sub-phase during which the correct alignment or the misalignment is evaluated as a function of at least the first transversal distance determined during the determination sub-phase;

wherein during the imaging sub-phase the at least one image is acquired to also contain the longitudinal edge of the web of packaging material;

wherein during the determination sub-phase also a second transversal distance between the longitudinal edge and the reference marker is determined; and wherein during the analysis sub-phase at least the correct alignment or the misalignment of the sealing strip is evaluated as a function of the first transversal distance and the second transversal distance.

2. The method according to claim 1, further comprising a correction phase being executed during the application phase if during the control phase a misalignment of the sealing strip with respect to the web of packaging material is detected and/or determined;

during the correction phase the relative alignment of the sealing strip with respect to the web of packaging material is altered so as to obtain a correct alignment of the sealing strip with respect to the web of packaging material.

3. The method according to claim 2, wherein the application phase comprises at least the following sub-phases:

an advancement sub-phase during which the sealing strip is advanced along a strip advancement path; and a placement sub-phase during which the first longitudinal portion of sealing strip is placed on the longitudinal edge of the web of packaging material;

wherein during the correction phase the strip advancement path and/or the web advancement path is or are varied so as to change the relative alignment of the sealing strip with respect to the web of packaging material.

4. The method according to claim 1, further comprising a marking phase during which the zones of the web of packaging material at which the sealing strip is misaligned are marked, in particular digitally marked, and/or the zones of the web of packaging material at which the sealing strip has a correct alignment are marked, in particular digitally marked.

5. The method according to claim 1, wherein during the analysis sub-phase the first transversal distance determined during the determination sub-phase is compared to a predetermined distance range;

wherein a correct alignment is determined if the determined first transversal distance lies within the predetermined distance range; and wherein a misalignment is determined if the determined transversal distance lies outside of the predetermined distance range.

6. The method according to claim 5, further comprising an adjustment phase, executed if the web of packaging material is misaligned with respect to the reference marker, during which the relative alignment of the web of packaging material and the reference marker is varied in such a manner that the relative alignment of the web of packaging material and the reference marker is obtained.

7. The method according to claim 1, wherein the strip application apparatus comprises a sealing device having a sealing head for sealing the first longitudinal portion of the sealing strip onto the longitudinal edge during the sealing phase; and wherein the sealing head is provided with the reference marker;

wherein during the imaging sub-phase the at least one image is acquired such that the image also shows at least a portion of the sealing head being provided with the reference marker.

8. The method according to claim 1, wherein during the analysis sub-phase a correct alignment or a misalignment of the web of packaging material and the reference marker with one another is evaluated as a function of the second transversal distance.

* * * * *